United States Patent

Niemann

[15] 3,700,756

[45] Oct. 24, 1972

[54] CATALYTIC BLOCK COPOLYMERIZATION OF POLAR MONOMERS

[72] Inventor: Theodore F. Niemann, Brecksville, Ohio

[73] Assignee: The B. F. Goodrich Company, New York, N.Y.

[22] Filed: Feb. 17, 1971

[21] Appl. No.: 116,237

Related U.S. Application Data

[62] Division of Ser. No. 862,962, Oct. 1, 1969, Pat. No. 3,609,101.

[52] U.S. Cl............260/881, 252/431, 260/33.6 NA, 260/885
[51] Int. Cl.......C08f 15/38, C08f 15/16, C08f 15/22
[58] Field of Search......................................260/881

[56] References Cited

UNITED STATES PATENTS

| | | |
|---|---|---|
| 3,026,311 | 3/1962 | Coover et al.............260/93.7 |
| 3,410,836 | 11/1968 | Hsieh et al................260/83.7 |
| 3,609,100 | 9/1971 | Niemann................252/431 R |
| 3,609,101 | 9/1971 | Niemann...................252/431 |

FOREIGN PATENTS OR APPLICATIONS

| | | |
|---|---|---|
| 1,934,593 | 1/1970 | Germany...................260/881 |
| 261,167 | 5/1963 | Australia................252/431 R |

*Primary Examiner*—Murray Tillman
*Assistant Examiner*—John Seibert
*Attorney*—J. Hughes Powell, Jr.

[57] ABSTRACT

Polar monomers can be copolymerized to obtain block copolymers by the sequential addition of the polar monomers when the polymerization is initiated with an organolithium compound in combination with a compound containing a sulfinyl or sulfonyl group. Acrylonitrile, methacrylonitrile and alkyl acrylates and methacrylates are copolymerized to two- and three-block copolymers with alkyl lithium-diphenyl sulfone or alkyl lithium-diphenyl sulfoxide initiator systems.

7 Claims, No Drawings

CATALYTIC BLOCK COPOLYMERIZATION OF POLAR MONOMERS

This is a division of application Ser. No. 862,962, filed Oct. 1, 1969 now U.S. Pat. No. 3,609,101.

BACKGROUND OF THE INVENTION

Anionic polymerization of nonpolar monomers to obtain block copolymers is known. Such polymerizations are typically conducted by the sequential addition of the nonpolar monomers into the anionic polymerization media or the anionic polymerization of mixtures of the monomers. Organolithium compounds generally function as initiators for these polymerizations.

The same anionic polymerization techniques are not generally applicable, however, for the formation of block polymers when polar monomers are to be employed. In the presence of polar monomers termination of the growing polymer chain results and low molecular weight polymers having little or no utility are obtained. Variations in catalyst concentration, catalyst type, polymerization media and polymerization temperature have been studied in an effort to obtain useful block copolymers with polar monomers, however, no completely acceptable method has been reported. n-Butyl lithium has been employed under a variety of polymerization conditions for the homopolymerization of polar monomers, including methacrylonitrile and methyl methacrylate, but two- and three-block copolymers of methacrylonitrile and methyl methacrylate were not obtained employing these same polymerization techniques.

SUMMARY OF THE INVENTION

I have now discovered an effective initiator system for the block copolymerization of polar monomers. The present process and initiator system permit the copolymerization of polar monomers such as acrylonitrile, methacrylonitrile or alkyl acrylates and methacrylates to obtain two- and three-block copolymers. The process consists of the sequential addition of the polar monomers to the polymerizing media containing an initiator system comprising an organolithium compound and a compound containing a sulfinyl or sulfonyl group. Alkyl lithium compounds in combination with diphenyl sulfone or diphenyl sulfoxide are effective initiator systems in the present process. The molar ratio of the sulfinyl or sulfonyl containing compound to the organolithium compound will range from about 3:1 to 0.5:1. The organolithium compound will be present in an amount from about 20 to about 500 millimols per mol of the initial monomer charged.

DETAILED DESCRIPTION

The present invention relates to the block copolymerization of polar monomers. The polymerization is initiated with an organolithium compound in combination with a compound containing a sulfinyl (>SO) or sulfonyl (>SO$_2$) molecular grouping. The organolithium compounds employed have the general formula R$+$Li)$_x$ wherein R is an aliphatic, aromatic or cycloaliphatic hydrocarbon radical containing from 1 to 12 carbon atoms and $x$ is 1 or 2. Typical organolithium compounds include: methyl lithium, isobutyl lithium, n-butyl lithium, secbutyl lithium, t-octyl lithium, n-decyl lithium, phenyl lithium, naphthyl lithium, 4-butyl lithium, p-tolyl lithium, cyclohexyl lithium, 4-butylcyclohexyl lithium and the like, or mixtures thereof. Excellent results have been obtained with alkyl lithium compounds wherein the alkyl group contains one to six carbon atoms. In addition to organolithium compounds, organosodium or organopotassium compounds may be employed to initiate the polymerization.

In preparing two- or three-block copolymers, organolithium compounds containing one carbon-metal bond are most often employed and the monomers to be polymerized are added sequentially. This produces polymer anions propagating or growing at one end only. Organolithium compounds containing two or even more carbon-metal bonds, such as 1,5-dilithiopentane, may be advantageously employed, however. These dimetallic initiators yield polymer anions propagating at two ends so that for each increment of monomer added after the first, two additional blocks will be added to the polymer. The dimetallic initiators are an especially convenient means for preparing three-block copolymer systems.

In combination with the organolithium compound is a compound containing a sulfinyl or sulfonyl molecular grouping. These compound correspond to the general formulae

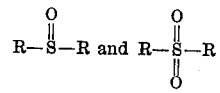

wherein R is an alkyl, cycloalkyl, aryl, alkaryl or aralkyl radical containing from one to about 12 carbon atoms. Excellent results have been obtained when diaryl sulfones or diaryl sulfoxides are employed with the organolithium compound, preferably an alkyl lithium compound wherein the alkyl group contains from about one to six carbon atoms. The aryl groups may contain one or more groups such as alkyl or the like substituted on the ring. Exemplary sulfinyl- and sulfonyl-containing compounds useful for the present invention include diphenyl sulfone, diphenyl sulfoxide, dibenzyl sulfone, dibenzyl sulfoxide, di-(p-tolyl)sulfone, di-(p-tolyl) sulfoxide, dicyclohexyl sulfone, dicyclohexyl sulfoxide, dimethyl sulfone, dimethyl sulfoxide, diethyl sulfoxide or the like.

The amount of the organolithium component employed will range between about 20 and 500 millimols per mol initial monomer charged and more preferably between 80 and 120 millimols per mol monomer. The amount of initiator will govern the molecular weight of the initial polymer block and may be varied accordingly. The organolithium compound and sulfinyl- or sulfonyl-containing compound will generally be present in essentially a 1:1 molar ratio. Molar ratios from about 3:1 to about 0.5:1 of the sulfone or sulfoxide to the organolithium compound can be employed, however. It is often advantageous to employ a slight molar excess of the organolithium compound to serve as a scavenger in the polymerization system for the removal of any impurities which may be present.

In conducting the polymerization the initiator system is utilized in a hydrocarbon solvent medium such as aromatic, paraffinic or cycloparaffinic hydrocarbons.

Typically, the same solvent employed for the polymerization medium will be employed in making up the initiator solution. Ordinarily, however, the initiator components are charged separately to the polymerizer before the initial monomer charge. Useful hydrocarbons include propane, isobutane, n-pentane, isopentane, cyclopentane, hexane, cyclohexane, benzene, toluene, xylene or the like, and mixtures thereof.

The temperature of polymerization can range between about −80° C. to about 50° C. depending on the monomers employed. Excellent results have been obtained with the initiator system of this invention at temperatures between about −60° C. and 10° C. As various monomers are polymerized to form the block segments, the polymerization temperature may be varied as required. For the present process it is essential that a "living" polymer be maintained throughout the polymerization. Impurities such as oxygen, air, water, alcohols and the like must therefore be excluded from the polymerizer since their presence serves to terminate the growing polymer chains.

The polymerization will typically be conducted by charging the initial monomer to the polymerizer which contains the initiator system and conducting the polymerization for the time necessary to insure substantially complete monomer conversion. The second monomer will then be charged and polymerized. If additional monomers are to be polymerized to form additional blocks, the procedure will be repeated as required.

To recover the block polymers from the polymerization system conventional techniques are employed. Typically, when the polymerization of the final block segment is essentially complete, a terminating agent material such as water, methanol, ethanol or the like will be added in sufficient quantity to terminate the reaction. If desired, larger quantities may be added so that the polymer will be precipitated from the solution at the same time. It is sometimes more convenient to add the inactivating material in quantities sufficient to terminate the polymerization but not precipitate the polymer, then to add a stabilizing amount of a material such as phenyl-β-naphthylamine, 4-methyl-2,6-di-t-butylcresol or the like prior to the precipitation of the polymer.

With the present process employing the organolithium-sulfone or sulfoxide initiator systems a wide variety of useful block polymer compositions can be obtained by varying the monomers employed, the number of block segments, the sequence of the block segments and the molecular weight of the block segments. The process of the present invention is particularly useful for the preparation of two- and three-block polymers. Heretofore there has been no convenient means for obtaining block polymers containing two- or three-block segments when the block segments were derived from polar monomers.

Polar monomers which may be polymerized to obtain block polymers in accordance with the present invention include acrylonitrile, methacrylonitrile, alkyl acrylates and alkyl methacrylates wherein the alkyl substituent contains from one to eight carbon atoms. Such alkyl acrylates and methacrylates include ethyl acrylate, butyl acrylate, 2-ethylhexyl acrylate, methyl methacrylate, ethyl methacrylate, isopropyl methacrylate, 2-ethylhexyl methacrylate and the like. The present process is particularly advantageous for the formation of two- and three-block copolymers derived from methacrylonitrile and methyl methacrylate. Block copolymers containing more than three polymer blocks may also be prepared in accordance with the present invention.

Any combination of polar monomers may be block polymerized, in any order, employing the present process. This is contrary to previously known anionic processes where, if polar monomers even could be polymerized, they had to be either homopolymerized or polymerized as the terminal block due to the tendency to terminate the growing chains. The initiator systems of the present invention permit the polymer anion obtained with the polar monomers to propagate freely with a minimum of termination. Heretofore, it has been unknown to obtain high molecular weight block polymer anions with polar monomers.

The block copolymers obtained by the present invention are useful in a wide variety of applications. They are typically thermoplastic materials having excellent clarity, low temperature properties and solvent resistance, and are readily processable. The block polymers may be molded or extruded into a variety of shaped products. Shoe soles, weather seals and tubing constitute useful applications for these block polymers. Solutions of these block polymers can be used for impregnating fabrics to obtain useful gasket compositions.

The following Examples serve to illustrate the invention more fully. All parts and percentages are given on a weight basis unless otherwise indicated.

In the Examples all solvents were distilled from calcium hydride under a nitrogen atmosphere and passed over 4 A. molecular sieves prior to use. Acrylonitrile, methacrylonitrile and the alkyl acrylate and alkyl methacrylate monomers also were distilled from calcium hydride and dried by passing through a 120 cm × 2 cm filled with molecular sieves. All solvents and monomers were stored under nitrogen.

The general procedure employed in conducting the block polymerizations was to charge the polymerizer which had been dried in an oven at 120° C. for a minimum of 18 hours and cooled and sealed under a nitrogen atmosphere with the solvent, catalyst and monomers, in that order. The general polymerization recipe employed in the following examples unless indicated otherwise is 40 mls toluene, 0.5 millimol of the catalyst system and 18 to 28 millimols monomers (total). The temperature of polymerization was −50° C. and the polymerizations conducted for about 2 to 3 hours. The organolithium compound was mixed with the sulfinyl or sulfonyl containing compound in the toluene solution at room temperature. This solution was then cooled to −50° C. before the addition of the monomers. The monomers were then sequentially added to the polymerizer.

EXAMPLE I

Methyl methacrylate-methacrylonitrile block copolymers were prepared by the sequential polymerization of the monomers employing an n-butyl lithium/diphenyl sulfoxide initiator system. The initiator system was prepared by charging 0.5 ml n-butyl lithium (0.80 millimol) and 0.1013 gram (0.50 millimol) diphenyl sulfoxide to the polymerizer containing 40 mls toluene. Two polymerizations were conducted in this manner. In the first polymerization, 1.0 ml (9.0 millimols) methyl methacrylate was initially charged to the polymerizer allowed to polymerize for about 60 minutes and then 1.0 ml (12 millimols) methacrylonitrile charged and the polymerization continued for an additional 60 minutes. In the second polymerization, 1 ml (12 millimols) methacrylonitrile was first charged and allowed to polymerize for about 60 minutes and then 1 ml (9.0 millimols) methyl methacrylate charged and the polymerization continued for 60 minutes. Both polymerizations were short-stopped by the addition of 1 ml of a 5 percent solution of HCl in methanol. The polymers were precipitated with cold hexane and dried in a 50° vacuum oven. Nearly complete conversion of the monomers was obtained in the first polymerization. In both instances, block copolymerization was confirmed by gas chromatographic analysis of the polymerization mixture prior to the addition of the second monomer and prior to the addition of the short-stopping agent. The intrinsic viscosity of the polymer (measured at 30° C. for a solution of 0.1250 gram polymer in 25 mls N,N-dimethylformamide) was 1.74.

EXAMPLE II

Methacrylonitrile and ethyl acrylate were block polymerized as follows: 500 mls toluene was charged to a 1 liter polymerizer and 1.01 grams (5.0 millimols) diphenyl sulfoxide and 5 mls (8.0 millimols) n-butyl lithium added thereto at room temperature. The reactor and its contents were cooled to −50° C. and 10 mls (120 millimols) methacrylonitrile charged over about 2.5 minutes during which time a temperature rise was noted. The polymerization was continued for 1 hour with stirring and the monomer conversion followed by gas chromatographic analysis. Ten mls (94 millimols) ethyl acrylate was then added to the reactor. After an additional 3 hours the polymerization was short-stopped by the addition of 2 mls methanol. The methacrylonitrile, ethyl acrylate block copolymer was precipitated by the addition of a methanol solution containing 10 percent by volume HCl. After a methanol wash the polymer was dried to constant weight in a 50° vacuum oven. The white rubbery powder had an intrinsic viscosity of 0.91.

EXAMPLE III

Employing the same procedure as described in Example II, a methyl methacrylate-acrylonitrile block polymer was prepared by the sequential addition of 10 mls (90 millimols) methyl methacrylate and 10 mls (150 millimols) acrylonitrile to the polymerizer. A colorless polymer was obtained in good yield.

EXAMPLE IV

An n-butyl lithium diphenyl sulfone initiator system was employed to prepare block copolymers of methyl methacrylate and methacrylonitrile. Two polymerizations were conducted as in Example I except that 0.013 gram diphenyl sulfone was employed in the place of diphenyl sulfoxide. Excellent yields of the two-block copolymers were obtained. Properties of the polymers were essentially the same as obtained with the n-butyl lithium/diphenyl sulfoxide initiated polymerization. Similar results were obtained when an n-butyl lithium/dimethyl sulfoxide initiator system was employed for the block copolymerization of methyl methacrylate with methacrylonitrile.

The methacrylonitrile-methyl methacrylate block copolymers obtained will typically have glass transition temperatures of about 60°–70° C. and 100°–115° C. The two-block copolymer, when extruded at 180° C., had an elongation of about 3.5 percent and the tensile at break was greater than 10,000 psi.

EXAMPLE V

Three-block copolymers were prepared by the sequential polymerization of increments of methacrylonitrile, methyl methacrylate and methacrylonitrile, in that order with an n-butyl lithium/diphenyl sulfoxide initiator system. Seventy-five ml portions of the monomers were employed for each charge. The polymerization was conducted at −50° C. and the polymerization times after the addition of the first and second monomers was about 1 hour. The total polymerization time was about 17 hours. The methacrylonitrile-methyl methacrylate-methacrylonitrile three-block copolymer was precipitated with methanol and washed with distilled water. The polymer was obtained as a colorless powder and had an intrinsic viscosity of 0.78. The polymer contained about 15.2 percent nitrogen by analysis.

I claim:

1. A process for the block copolymerization of polar monomers comprising sequentially polymerizing two or more polar monomers selected from the group consisting of acrylonitrile, methacrylonitrile and alkyl esters of acrylic acid or methacrylic acid wherein the alkyl group contains from 1 to 8 carbon atoms at a temperature between about −80° C. and 50° C. with (1) an organolithium compound of the formula R(Li)$_x$ wherein R is an aliphatic, aromatic or cycloaliphatic hydrocarbon radical containing from one to 12 carbon atoms and $x$ is one or two and (2) a compound selected from the group consisting of

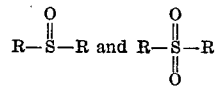

wherein R is an alkyl, cycloalkyl, aryl, alkaryl or aralkyl radical containing from 1 to 12 carbon atoms, in a molar ratio of (2) to (1) from about 3:1 to about 0.5:1.

2. The block copolymerization process of claim 1 wherein the concentration of (1) is between about 20 and 500 millimols per mol of the initial polar monomer charge.

3. The block copolymerization process of claim 2 wherein the concentration of (1) is between about 80 and 120 millimols per mol of the initial polar monomer charge and (1) and (2) are present in essentially a 1:1 molar ratio and which is conducted in an aromatic, paraffinic or cycloparaffinic hydrocarbon solvent medium at a temperature between about −60° C. and 10° C.

4. The block copolymerization process of claim 2 wherein (1) is an alkyl lithium compound wherein the alkyl group contains from one to six carbon atoms and (2) is a diaryl sulfone or diaryl sulfoxide.

5. The block copolymerization process of claim 4 conducted in an aromatic, paraffinic or cycloparaffinic hydrocarbon solvent medium with a concentration of (1) between about 80 and 120 millimols per mol initial monomer charge.

6. The block copolymerization process of claim 5 wherein the polar monomers are methyl methacrylate and methacrylonitrile, (1) is n-butyl lithium, (2) is diphenyl sulfoxide and (1) and (2) are present in essentially a 1:1 molar ratio, and is conducted at a temperature between about $-60°$ C. and $10°$ C. in toluene.

7. The block copolymerization process of claim 5 wherein the polar monomers are methyl methacrylate and methacrylonitrile, (1) is n-butyl lithium, (2) is diphenyl sulfone and (1) and (2) are present in essentially a 1:1 molar ratio, and is conducted at a temperature between about $-60°$ C. and $10°$ C. in toluene.

* * * * *